US010825091B2

(12) United States Patent
Roberts et al.

(10) Patent No.: US 10,825,091 B2
(45) Date of Patent: Nov. 3, 2020

(54) METHOD OF CREATING AND MAINTAINING MULTI-MANAGER EXCHANGE TRADED FUNDS

(71) Applicant: RUSSELL INVESTMENTS GROUP, LLC, Olympia, WA (US)

(72) Inventors: Mark Stadler Roberts, Orinda, CA (US); Richard Frank Johnson, Jr., Mercer Island, WA (US); Robert Kuharic, Tacoma, WA (US); Joseph DeWayne Smith, Walnut Creek, CA (US)

(73) Assignee: RUSSELL INVESTMENTS GROUP, LLC, Olympia, WA (US)

( * ) Notice: Subject to any disclaimer, the term of this patent is extended or adjusted under 35 U.S.C. 154(b) by 0 days.

(21) Appl. No.: 16/175,468

(22) Filed: Oct. 30, 2018

(65) Prior Publication Data

US 2019/0066212 A1    Feb. 28, 2019

Related U.S. Application Data

(63) Continuation of application No. 13/564,060, filed on Aug. 1, 2012, now abandoned.
(Continued)

(51) Int. Cl.
*G06Q 40/00* (2012.01)
*G06Q 40/04* (2012.01)
*G06Q 40/06* (2012.01)

(52) U.S. Cl.
CPC ............ *G06Q 40/04* (2013.01); *G06Q 40/00* (2013.01); *G06Q 40/06* (2013.01)

(58) Field of Classification Search
CPC ..................................................... G06Q 40/00
See application file for complete search history.

(56) References Cited

U.S. PATENT DOCUMENTS 6,221,997 B1    4/2001  Woodhouse et al.
7,571,130 B2 *  8/2009  Weber ................... G06Q 40/08
                                                   705/36 R
(Continued)

FOREIGN PATENT DOCUMENTS

JP    2003-242346    8/2003
JP    2004348757     9/2004
(Continued)

OTHER PUBLICATIONS

David Vissinger, An investigation of the Exchange Traded Fund with a special focus on the swap-based structure, Jun. 2009, Copenhagen Business School, web, 1-70 (Year: 2009).*

(Continued)

*Primary Examiner* — I Jung Liu
(74) *Attorney, Agent, or Firm* — Davis Wright Tremaine LLP; George C. Rondeau, Jr.; Heather M. Colburn

(57) ABSTRACT

Systems and methods for creating and maintaining multi-manager exchange traded funds. An embodiment of a method includes receiving a plurality of model portfolios, each created by a different portfolio manager and identifying a plurality of assets traded on a stock exchange. A portfolio composition file is created based at least in part on at least a portion of the model portfolios. The portfolio composition file identifies a set of constituent assets traded on the stock exchange. One or more authorized participants are authorized to trade the set of constituent assets for a creation unit of an exchange traded fund. The creation unit includes at least one share that is tradable on the stock exchange by both the authorized participant(s) and the investors.

11 Claims, 6 Drawing Sheets

Related U.S. Application Data

(60) Provisional application No. 61/537,964, filed on Sep. 22, 2011.

(56) References Cited

U.S. PATENT DOCUMENTS

| | | | |
|---|---|---|---|
| 2003/0120575 A1 | 6/2003 | Wallman | |
| 2006/0100955 A1 | 5/2006 | Baldassini et al. | |
| 2006/0253376 A1 | 11/2006 | Seale et al. | |
| 2009/0063363 A1 | 3/2009 | Friedman et al. | |
| 2010/0262563 A1* | 10/2010 | Arnott .................... | G06Q 40/00 705/36 R |
| 2011/0166983 A1 | 7/2011 | Tucker et al. | |
| 2011/0196777 A1 | 8/2011 | Friedman et al. | |

FOREIGN PATENT DOCUMENTS

| | | |
|---|---|---|
| JP | 2010524079 | 7/2010 |
| KR | 20070057099 | 6/2007 |
| KR | 20090123351 | 12/2009 |

OTHER PUBLICATIONS

Anon., "Exchange-traded fund," Wikipedia, Feb. 2011, Retrieved Aug. 17, 2017, Retrieved from the Internet: https://web.archive.org/web/20110226160600/http://en.wikipedia.org:80/wiki/Exchange-traded_fund.

Anon., "Distributed Investment," The Kukmin Daily Article, May 19, 2009, retrieved Aug. 17, 2017, Retrieved from the Internet: http://news.naver.com/main/read.nhn?mode=LSD&mid=sec&sid1=101&oid=005&aid=0000362214.

English abstract of Japanese Patent Publication No. 2003-242346 obtained from Espace.net on Apr. 8, 2013, 2 pages.

International Search Report received in International Application No. PCT/US2012/056148 dated Feb. 28, 2013, 9 pages.

Office Action, dated Aug. 29, 2016, received in Japanese Patent Application No. 2014-531933.

Office Action, dated Oct. 18, 2016, received in Australian Patent Application No. 2012312455.

Office Action, dated Aug. 22, 2017, received in Korean Patent Application No. 10-2014-7010123.

\* cited by examiner

METHOD OF CREATING AND MAINTAINING MULTI-MANAGER EXCHANGE TRADED FUNDS

CROSS REFERENCE TO RELATED APPLICATION(S)

This application claims the benefit of U.S. Provisional Application No. 61/537,964, filed on Sep. 22, 2011, which is incorporated herein by reference in its entirety.

BACKGROUND OF THE INVENTION

Field of the Invention

The present invention is directed generally to methods of implementing exchange traded funds, and more particularly to methods of implementing a multi-manager investment strategy for exchange traded funds.

Description of the Related Art

FIG. 1 is a diagram 100 illustrating entities and information flows between those entities involved in a prior art method of creating and trading shares of an exchange traded fund ("ETF"). An ETF includes one or more constituent assets (such as securities) that define the ETF. Some ETFs are designed to mirror the performance of an underlying market index, while other ETFs are actively managed and seek to outperform a market benchmark. An ETF entity 102 determines which constituent assets are included in the ETF. A fund manager employed by the ETF entity 102 may manage the ETF.

The ETF entity 102 also creates and sells shares of the ETF. However, instead of creating ETF shares and selling them directly to one or more investors 108 (as is typically done with a mutual fund) the ETF entity 102 creates and redeems ETF shares with one or more authorized participants ("AP(s)") 104. In the embodiment illustrated, the AP(s) 104 include an AP "A" and an AP "B." However, as is appreciated by those of ordinary skill in the art, the AP(s) 104 may include any number of APs.

The ETF entity 102 creates and sells ETF shares in blocks including a predetermined number of ETF shares, referred to as "creation units." A creation unit may include any number of ETF shares but typically includes 50,000 shares to 100,000 shares.

The creation and sale of ETF shares is generally referred to as an "in-kind" transaction. This means the ETF entity 102 provides a creation unit of ETF shares (identified by arrow 105) to the AP(s) 104 for each basket of constituent assets (identified by arrow 103) provided by the AP(s) that define or correspond to a creation unit of the ETF. Thus, the AP(s) 104 may acquire new ETF shares by first purchasing shares of the constituent assets (identified by arrow 107) that define a creation unit of the ETF on a stock exchange 106 and exchanging them for a creation unit (identified by arrow 105) of the ETF.

The AP(s) 104 may then sell the ETF shares (identified by arrow 109) to the investor(s) 108 via the stock exchange 106. This is sometimes referred to as the secondary marketplace for ETF shares. The investor(s) 108 may buy and sell ETF shares (identified by double-headed arrow 101) on the stock exchange 106.

To redeem ETF shares, one or more of the AP(s) 104 may return a creation unit of the ETF shares to the ETF entity 102, and receive (in exchange for the ETF shares) a basket of the constituent assets that define the creation unit of the ETF.

The constituent assets of the ETF are listed in a portfolio composition file ("PCF"). Generally, each day after the stock exchange 106 has closed, the ETF entity 102 publishes a new PCF (identified by arrow 111) to a PCF information distribution entity 110. The PCF information distribution entity 110 is an entity authorized to disseminate the new PCF to the public under applicable laws and regulations. Depending upon the applicable laws and regulations, the PCF information distribution entity 110 may be the ETF entity 102 and/or a third party entity such as a clearing house entity (e.g., The Depository Trust & Clearing Corporation, National Securities Clearing Corporation, and the like). The constituent assets of the ETF may change over the lifetime of the ETF. Modifications to the constituent assets are contained in the new PCF (identified by arrow 111) provided to the PCF information distribution entity 110. Before the stock exchange 106 reopens, the PCF information distribution entity 110 communicates ETF constituent information (identified by arrow 112) identifying the constituent assets of the ETF to the AP(s) 104.

Next, the assets actually held by the ETF must be modified to correspond to those listed in the new PCF. After receiving the ETF constituent information, each of the AP(s) 104 determines whether it must purchase additional assets on the stock exchange 106 to provide to the ETF entity 102 and whether the ETF entity 102 must return to the AP(s) 104 previously purchased assets that are not listed in the new PCF. How many assets are purchased by or returned to each of the AP(s) 104 is determined by how many creation units the AP has created and not yet redeemed. Double-headed arrow 113 illustrates both constituent assets provided to the ETF entity 102 by the AP(s) 104 when the PCF lists assets not included previously in the ETF and constituent assets returned to the AP(s) 104 by the ETF entity 102 when the PCF no longer lists assets that were previously included in the ETF. Double-headed arrow 114 illustrates both the purchase of additional constituent assets by the AP(s) 104 on the stock exchange 106 (which occurs when the PCF lists assets not included previously in the ETF) and the optional sale of any constituent assets returned to the AP(s) 104 by the ETF entity 102 when the PCF no longer lists assets that were previously included in the ETF.

A multi-manager investment strategy invests in multiple portfolios controlled by different portfolio managers. Thus, a multi-manager investment strategy combines the styles and expertise of several investment portfolio managers and reduces risk and exposure to each of the individual portfolio managers, particularly in fluctuating market conditions. A fund implemented using a multi-manager investment strategy is referred as a multi-manager fund. A multi-manager fund may be managed by a fund manager (who is typically also a provider of the multi-manager fund).

Depending upon their implementation details, multi-manager funds may provide one or more of the following advantages over funds that invest in assets determined by a single portfolio manager.

An extra layer of risk management. The fund manager of the multi-manager fund may be analogized to a conductor in an orchestra. Each of the musicians (or portfolio managers contributing to the multi-manager fund) in the orchestra is an expert in his/her own right, but the conductor brings them together for the benefit of the overall portfolio.

Monitoring of portfolio managers. The fund manager of the multi-manager fund monitors the individual portfolio managers who contribute to the multi-manager fund. Such monitoring may include conducting regular face-to-face reviews with the portfolio managers and ensuring that the portfolio managers do not deviate significantly from their investment strategies.

As appropriate, the fund manager of the multi-manager fund will hire and fire the individual portfolio managers who contribute to the multi-manager fund.

The fund manager of the multi-manager fund may scrutinize the individual portfolio managers who contribute to the multi-manager fund on an ongoing basis. The fund manager of the multi-manager fund may use a specialized monitoring system to evaluate the portfolio managers, including processes used by the portfolio managers, portfolios created by the portfolio managers, the performance of each of the portfolio managers, and the like.

Convenience. A multi-manager fund allows an investor to monitor and track an entire investment portfolio encapsulated in the single multi-manager fund.

Affordability. With a large investor base, the fund manager of the multi-manager fund may obtain volume discounts from the individual portfolio managers who contribute to the multi-manager fund and pass these discounts on to investors in the multi-manager fund. As a result, multi-manager funds tend to be price competitive with other types of funds that invest in assets determined by a single portfolio manager.

ETFs have traditionally been created based on indexes and funds that invest in assets determined by a single portfolio manager. In other words, ETFs have not been able to benefit from multi-manager investment strategies. Further, conventional multi-manager investment strategies (such as those used to implement multi-manager mutual funds) cannot be applied to ETFs. For example, one conventional multi-manager investment strategy allocates portions of a multi-manager fund to different portfolio managers to manage. Each portfolio manager manages his/her portion of the multi-manager fund within an account at a custodian bank. Because only the AP(s) 104 can create and redeem shares of an ETF using in-kind transactions, the aforementioned conventional multi-manager investment strategy simply cannot be implemented for ETFs. Therefore, a need exists for methods of implementing multi-manager investment strategies for ETFs. The present application provides this and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Definition of Terms

Figure 1:
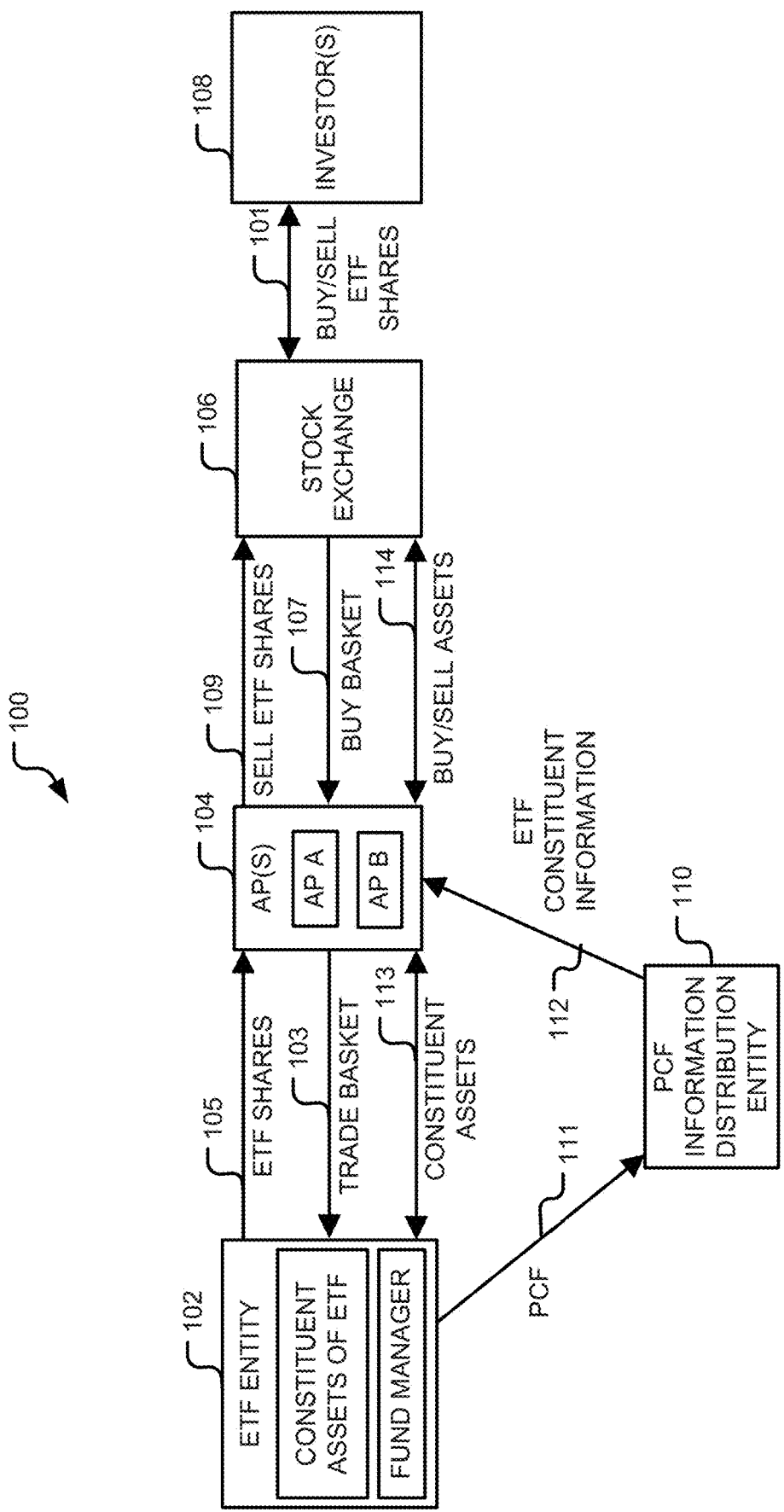
FIG. 1 is a diagram illustrating entities and information flows between those entities involved in a prior art method of creating and trading shares of an exchange traded fund ("ETF").

Unless defined otherwise, technical and financial terms used herein have the same meaning as commonly understood by one of ordinary skill in the art to which this invention belongs. For purposes of the present invention, the following terms are defined below.

Asset: a purchasable tangible or intangible item having economic value. Examples of assets include shares in a mutual fund, shares of a stock, exchange traded products (defined below), bonds, and the like.

Asset Class: a group of securities that exhibit similar characteristics, behave similarly in the marketplace, and are subject to the same laws and regulations. The three main asset classes are equities (e.g., stocks), fixed-income (e.g., bonds), and cash equivalents (e.g., money market instruments). However, asset classes may include additional types of assets, such as real estate and commodities. Each asset class may reflect different risks, return, or investment characteristics. Further, different asset classes may perform differently in the same market environment.

Authorized Participant ("AP"): Entities (e.g., large institutional investors) that may create or redeem shares of an ETF (defined below) by exchanging constituent assets of the ETF (defined below) for shares of the ETF directly with an ETF entity. An AP may act as a market maker for the ETF on the open market.

Clearing House Entity: a financial services company that provides clearing and settlement services for financial transactions, and often acts as central counterparty (a payor actually pays the clearing house, which then pays a payee). As a result, traders are not exposed to risks that the counterparty will not perform on a trade.

Constituent Assets of an ETF: the assets and/or derivatives (where legal) held by (and defining) the ETF.

Creation Unit: A predetermined number of ETF shares that make up one unit of the ETF. One creation unit is the denomination of constituent assets that can be exchanged for the predetermined number of ETF shares.

Exchange Traded Fund ("ETF"): an investment vehicle traded on at least one stock exchange that holds either assets (such as stocks, exchange traded products, bonds, and the like) or derivatives (that represent such exposures) and trades at approximately the same price as the net asset value of these underlying assets or derivatives over the course of the trading day. Most ETFs track an index, such as the Russell 1000® index, Russell 1000® Value index, Russell 1000® Growth index, Russell 2000® index, and the like. Only AP(s) (which are typically, large institutional investors) create or redeem shares of an ETF by exchanging the underlying assets or derivatives for shares of the ETF directly with the ETF entity.

Exchange Traded Product ("ETP"): a derivatively-priced security that trades intra-day on a national stock exchange. ETPs are typically benchmarked to indices, stocks, commodities, or may be actively managed. Examples of ETPs include ETFs, exchange traded notes, closed-end funds, and similar exchange traded (or listed) trust vehicles that may hold equities, fixed income assets, real estate, commodities, alternatives, and the like.

Multi-manager ETF: an ETF constructed from portfolios provided by more than one portfolio manager. A multi-manager ETF may be managed by a fund manager.

Portfolio Composition File ("PCF"): a file that identifies a basket of constituent assets that define a block (e.g., a creation unit) of shares of an ETF. For each constituent asset, the PCF may include the identifier of the constituent asset, the number of shares of the constituent asset included in the basket, and a weight for the constituent asset. The ETF entity publishes the PCF to the PCF information distribution entity daily. The PCF information distribution entity provides the information in the PCF to the AP(s) and market makers for valuing and/or pricing the ETF shares in the market (e.g., on the stock exchange 106 illustrated in FIG. 4) and facilitating the creation and redemption of shares of the ETF at Net Asset Value ("NAV"). ETF entities are required to generate and publish a PCF daily for each ETF.

Prospectus: A document required by and filed with the Securities and Exchange Commission that provides details about an investment offering for sale to the public. A prospectus is intended to contain facts that an investor would need to make an informed investment decision.

Risk Models: models (e.g., computer-generated models) used by portfolio managers and/or fund managers to evaluate an amount of risk associated with investing in a particular portfolio. Risk models typically provide information related to risk factors such as liquidity, momentum, volatility, exchange rate sensitivity, combinations thereof, and the like.

System 200

Figure 2:
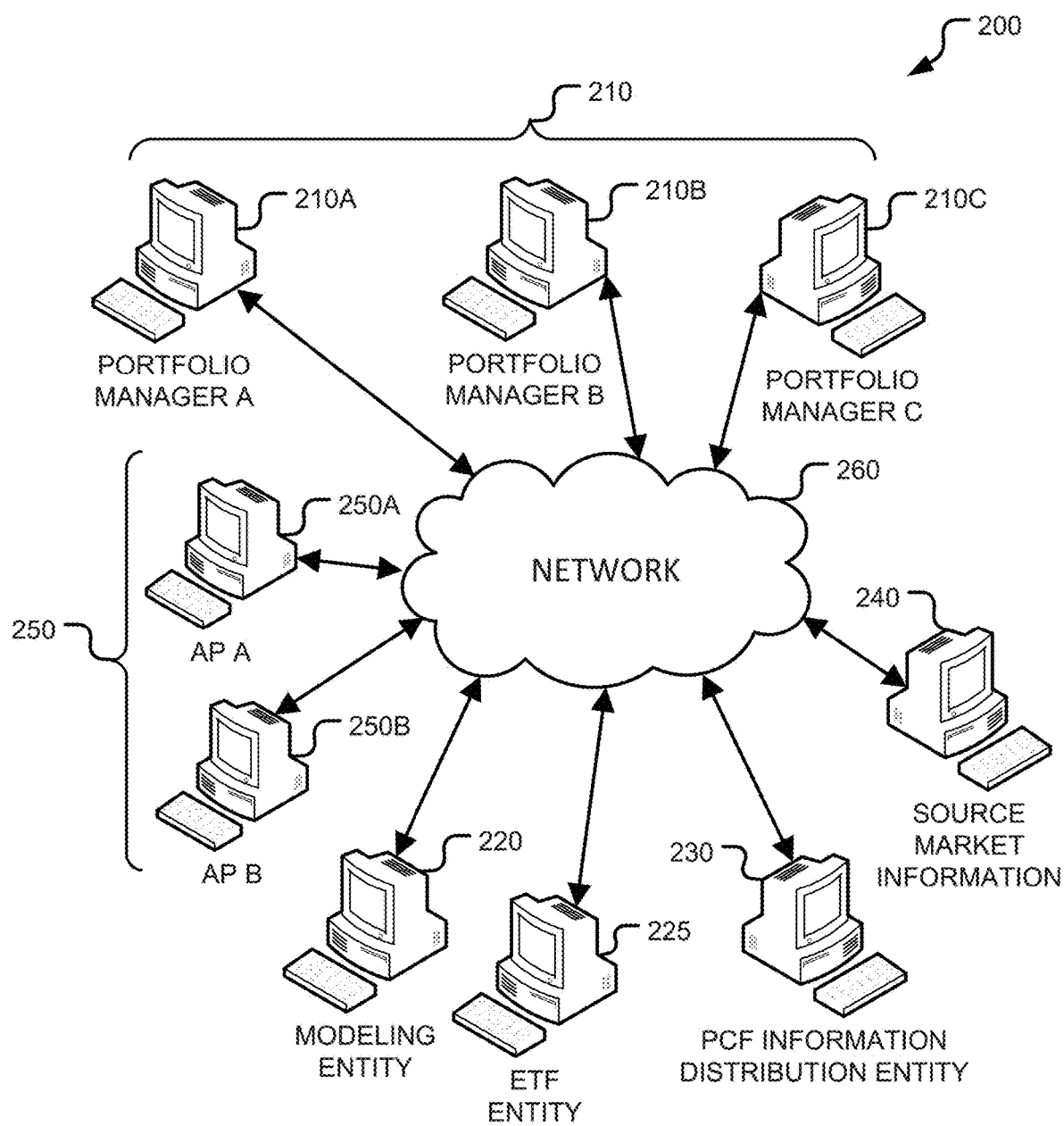
FIG. 2 is a diagram of a system that includes computing devices operated by two or more portfolio managers, a modeling entity, an ETF entity, a PCF information distribution entity, one or more sources of market information, and one or more authorized participants ("APs").

FIG. 2 is a diagram of a system 200. The system 200 includes computing devices 210 operated by two or more portfolio managers 402 (see FIG. 4), one or more computing devices 220 operated by a modeling entity 404 (see FIG. 4), one or more computing devices 225 operated by an ETF entity 406 (see FIG. 4), one or more computing devices 230 operated by the PCF information distribution entity 110 (see FIG. 4), one or more computing devices 240 operated by one or more sources of market information 408 (e.g., Bloomberg LP, International Data Corporation ("IDC"), FactSet Research Systems Inc., and the like), and one or more computing devices 250 operated by the one or more AP(s) 104 (see FIG. 4). The modeling entity 404 may be the same entity as the ETF entity 406. In such embodiments, the system 200 may omit the one or more computing devices 220. However, this is not a requirement. In the embodiment illustrated, the computing devices 210, 220, 225, 230, 240, and 250 are connected to one another by a network 260. By way of a non-limiting example, the computing devices 210 illustrated in FIG. 2 include computing devices 210A, 210B, and 210C operated by a Portfolio Manager "A," a Portfolio Manager "B," and a Portfolio Manager "C," respectively. Also, by way of a non-limiting example, the computing devices 250 illustrated in FIG. 2 include computing devices 250A and 250B operated by the AP "A" and the AP "B," respectively. However, as is appreciated by those of ordinary skill in the art, the system 200 may include any number of computing devices 210 and the computing devices 250.

Method 300

Figure 3:
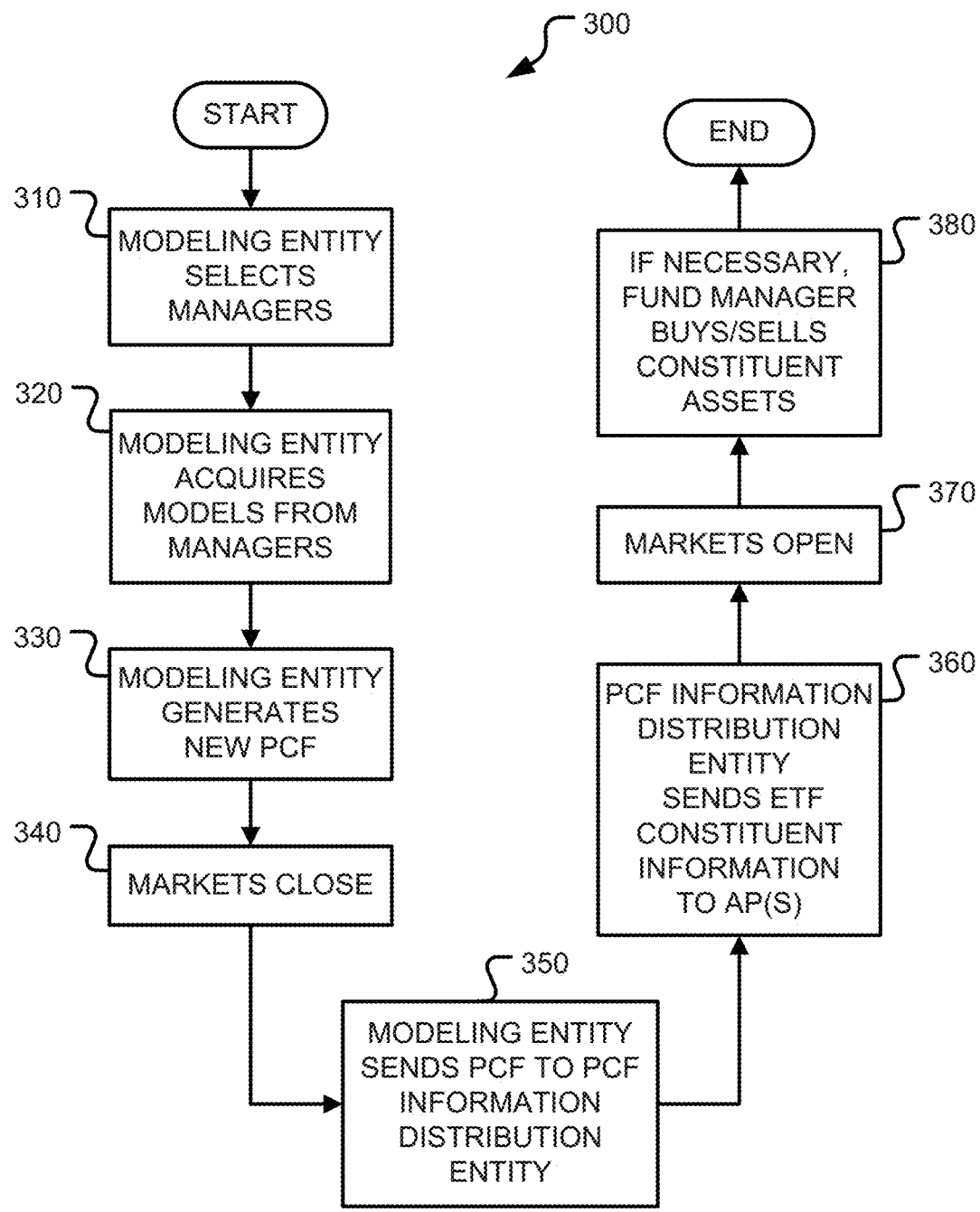
FIG. 3 is a flow diagram of a method that may be performed by the system of FIG. 2 and used to create and/or maintain a multi-manager ETF.

FIG. 3 is a flow diagram of a method 300 that may be performed by the system 200 (see FIG. 2). The method 300 may be used to create and/or maintain a multi-manager ETF. All or portions of the method 300 may be performed daily.

Figure 4:
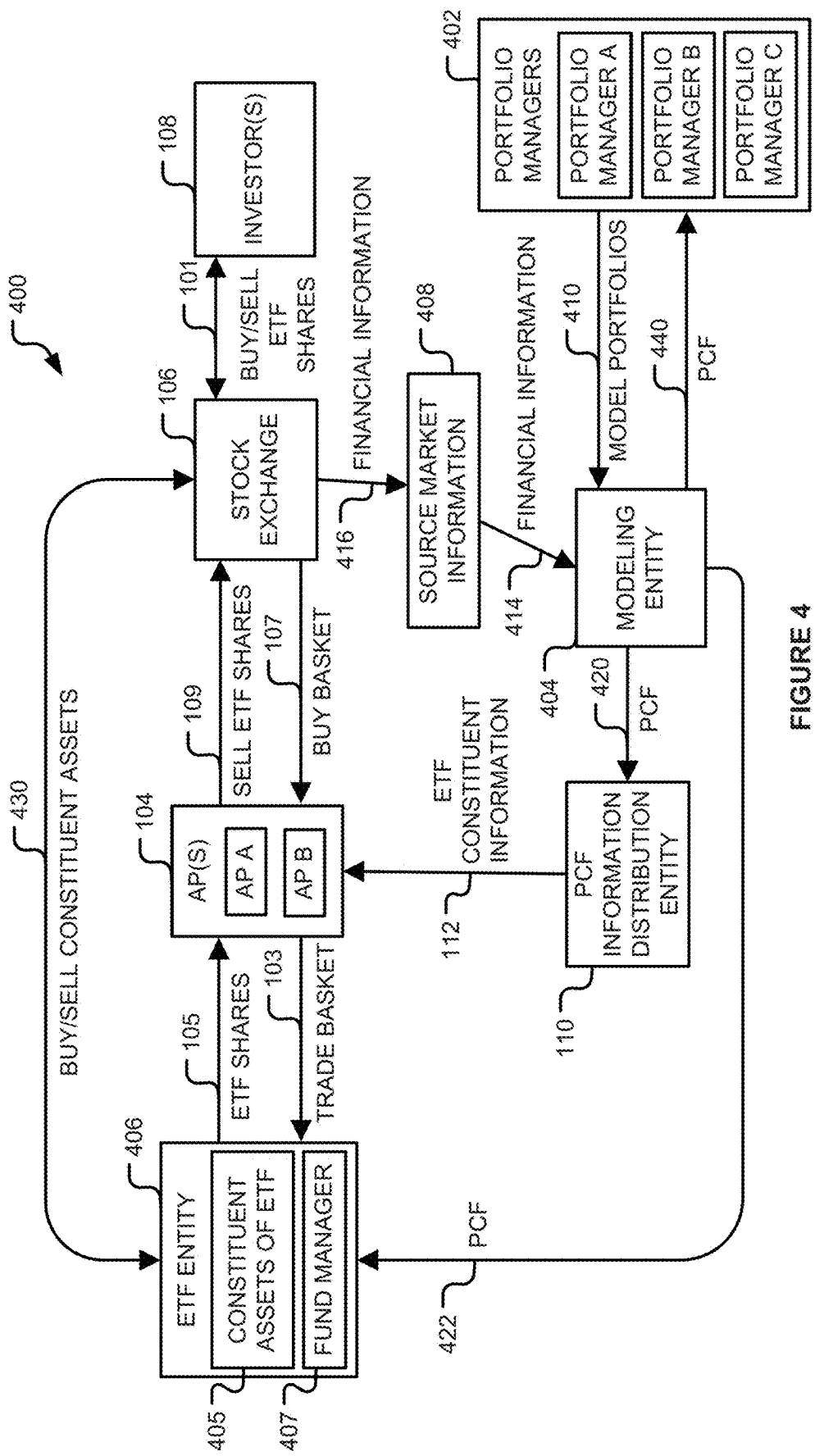
FIG. 4 is a diagram illustrating entities and information flows between those entities involved in the method of FIG. 3.

FIG. 4 is a diagram 400 illustrating entities and information flows between those entities involved in the method 300. Like reference numerals have been used to identify like entities and information flows illustrated in the diagram 100 of FIG. 1. The ETF entity 406 holds the constituent assets 405 of the ETF and employs a fund manager 407 to manage the constituent assets 405.

Referring to FIGS. 3 and 4, in first block 310, two or more of the portfolio managers 402 are selected by the modeling entity 404. By way of a non-limiting example, up to fifteen portfolio managers may be selected. For ease of illustration, in first block 310, the modeling entity 404 selects the Portfolio Manager "A," the Portfolio Manager "B," and the Portfolio Manager "C."

By way of a non-limiting example, in block 310, the modeling entity 404 may select the portfolio managers 402 using the following process:
1. Identify a set of portfolio managers;
2. Assign a score (e.g., a quality score) to each portfolio manager;
3. Rank the portfolio managers in accordance with their scores;
4. Select a sub-set of the highest-ranked portfolio managers using at least one of the following techniques:
   a. Manager combination profiles;
   b. Correlation matrices;
   c. Scenario analysis; and
   d. Portfolio attribution; and
5. Divide the selected sub-set of portfolio managers into portfolio "sleeves" or groupings having shared characteristics (e.g., style, use of a market capitalization based weighting scheme, risk tolerance, and the like).

The score assigned to each of the portfolio managers may be based on past performance and determined using a conventional due diligence process.

While methods of selecting the two or more portfolio managers 402 have been provided above, those of ordinary skill in the art appreciate that alternate methods exist and may be used in block 310 instead of the methods described above. In other words, the use of conventional methods to select the two or more portfolio managers 402 are within the scope of the present teachings.

In next block 320, each of the portfolio managers 402 selected in block 310 sends a model portfolio to the computing device(s) 220 operated by the modeling entity 404. Thus, each of the computing devices 210 is configured to provide a model portfolio (illustrated by arrow 110) via the network 260 (see FIG. 2) to the one or more computing devices 220 (see FIG. 2) operated by the modeling entity 404. In this manner, in block 320, the modeling entity 404 acquires the model portfolios from the portfolio managers 402. Each model portfolio identifies one or more constituent assets. For each constituent asset, each model portfolio includes the identifier of the constituent asset, and a number of shares of the constituent asset included in the model portfolio (or a weight assigned to the constituent asset from which the number of shares of the constituent asset may be determined). Optionally, for each constituent asset, each model portfolio may include both the number of shares of the constituent asset and the weight assigned to the constituent asset from which the number of shares of the constituent asset may be determined. In some embodiments, each of the model portfolios includes a buy-list of constituent asset identifiers along with a number of shares to buy (or a weight from which the number of shares to buy may be determined), and a sell-list of constituent asset identifiers along with a number of shares to sell (or a weight from which the number of shares to sell may be determined) that may be used to implement the model portfolio.

In some embodiments, each of the portfolio managers 402 is unaware of the contents of the model portfolios prepared by the other portfolio managers. However, this is not a requirement.

In block 330, the one or more computing devices 220 (see FIG. 2) use the model portfolios to create a new PCF identifying the one or more constituent assets that will make up the multi-manager ETF. Optionally, the one or more computing devices 220 (see FIG. 2) use the model portfolios to create a trade list identifying trades to be performed by the fund manager 407 to modify the constituent assets 405 held by the ETF entity 406. Optionally, in addition to the model portfolios, the one or more computing devices 220 (see FIG. 2) also use financial information (illustrated as arrow 414) received from the one or more computing devices 240 (see FIG. 2) operated by the one or more sources of market information 408 via the network 260 (see FIG. 2). The financial information illustrated as arrow 414 may include price information for assets, share volumes traded, and the like. The one or more computing devices 240 (see FIG. 2) operated by the one or more sources of market information 408 may receive at least a portion of the financial information (illustrated as arrow 416) from the stock exchange 106 via the network 260 (see FIG. 2).

The portfolio managers 402 selected in block 310 may remain constant or change over time. For example, one or more of the portfolio managers 402 selected in block 310 may underperform or otherwise need to be replaced. Unfortunately, under applicable laws and regulations, the process of replacing a portfolio manager is lengthy (e.g., typically requiring 3-6 months). To avoid the long legal process of replacing a portfolio manager, the model portfolios provided by some of the portfolio managers 402 selected in block 310 may not be used to create the new PCF. Such portfolio managers may be referred to as being "on deck." For example, in block 310, five managers may be selected and approved to participate in the creation of the new PCF for the multi-manager ETF. However, only the model portfolios supplied by three of the five managers may be used to create the new PCF. These portfolio managers may be referred to as "active." The other two portfolio managers are each waiting "on deck" in the event that one of the active portfolio managers must be replaced. Because the "on deck" portfolio managers are board-approved and already identified in a prospectus for the ETF, an "on deck" portfolio manager may replace an active portfolio manager in days, rather than months.

Then, in block 340, the financial markets (e.g., the stock exchange 106) close where the one or more constituent assets listed in the new PCF are traded. In alternate embodiments, the blocks 320 and 330 may be performed after block 340. Further, in some embodiments, the block 310 may be performed after block 340.

In block 350, the modeling entity 404 transmits the new PCF and/or a trade list (illustrated as arrow 420) to the one or more computing devices 230 (see FIG. 2) operated by the PCF information distribution entity 110. Thus, the computing device(s) 220 is/are configured to provide the new PCF and/or the trade list via the network 260 (see FIG. 2) to the one or more computing devices 230 operated by the PCF information distribution entity 110. In embodiments where the modeling entity 404 is other than the ETF entity 406, the modeling entity 404 may also transmit the new PCF and/or the trade list (illustrated as arrow 422) to the ETF entity 406. In such embodiments, the computing device(s) 220 is/are configured to provide the new PCF and/or the trade list via the network 260 to the one or more computing devices 225 operated by the ETF entity 406.

In block 360, the one or more computing devices 230 operated by the PCF information distribution entity 110 transmit the ETF constituent information (illustrated as arrow 112) via the network 260 to the one or more computing devices 250 operated by the AP(s) (e.g., the AP "A," the AP "B," and the like). The ETF constituent information may include the entire new PCF or portions thereof. Thus, in some embodiments, the one or more computing devices 230 may extract information from the PCF and forward it to the one or more computing devices 250 operated by the AP(s). In embodiments where the modeling entity 404 is other than the ETF entity 406, the PCF information distribution entity 110 may also transmit the ETF constituent information to the ETF entity 406. In such embodiments, the computing device(s) 230 is/are configured to provide the ETF constituent information via the network 260 to the one or more computing devices 225 operated by the ETF entity.

As explained above, if the modeling entity 404 is other than the ETF entity 406, the modeling entity 404 and/or the PCF information distribution entity 110 may provide the new PCF, the trade list, and/or ETF constituent information to the ETF entity 406.

Then, in block 370, the financial markets (e.g., the stock exchange 106) open where the one or more constituent assets identified in the new PCF are traded.

In block 380, if necessary, the fund manager 407 buys new constituent assets on the market(s) where such assets are sold and/or sells constituent assets currently held by the ETF entity 406 (illustrated by double-headed arrow 430). In some embodiments, when the constituent assets identified in the new PCF differ from the constituent assets 405 currently held by the ETF entity 406, the constituent assets 405 held by the ETF entity are modified to correspond to those listed in the new PCF. In such embodiments, after receiving the ETF constituent information and/or the new PCF, the fund manager 407 (a) determines whether additional constituent assets must be purchased on the financial markets where such constituent assets are traded (e.g., the stock exchange 106), (b) determines whether one or more of the constituent assets 405 currently held by the ETF entity 406 must be sold on the financial markets where such constituent assets are traded (e.g., the stock exchange 106), and (c) effects the purchase and/or sale of assets on the financial markets where such constituent assets are traded (e.g., the stock exchange 106) in accordance with the aforementioned determinations.

In embodiments in which the trade list is generated, in block 380, the fund manager 407 executes the trades identified in the trade list. As is apparent to those of ordinary skill in the art, in some embodiments, the constituent assets 405 may include assets not listed on the new PCF. In other words, the basket of assets required to obtain a creation unit of the ETF may not include each asset in the ETF. Therefore, the trade list may include assets not included in the PCF. Further, a new PCF may omit an asset included on a previous PCF and the trade list may not indicate a sale of the omitted asset. Thus, the trade list is used to determine which assets are held by the ETF entity 406 and the ETF constituent information and/or the new PCF are used to identify the assets to be included in the basket of assets that may be exchanged for a creation unit of the ETF.

At some point after block 340 and before the method 300 terminates, at least one of the modeling entity 404, the ETF entity 406, and the PCF information distribution entity 110 optionally provides the trade list, the new PCF, and/or ETF constituent information (illustrated by arrow 440) to the portfolio managers 402 to be used thereby to prepare the next set of model portfolios.

Then, the method 300 terminates.

In some embodiments, the modeling entity 404 generates the new PCF file about 24 hours before the new PCF is effective. In other words, a basket including the constituent assets identified in the new PCF cannot be traded for a creation unit of the ETF until after trading opens on the next day. In such embodiments, the method 300 occurs over three trading days. On the first trading day, blocks 310 to 340 may be performed. Between the first and second trading days, block 350 and 360 may be performed. On the second day, block 380 may be performed. On the third day, the new PCF becomes effective.

After block 380, the method 300 may be repeated to generate another new PCF. When the method 300 repeats, the block 310 may be repeated or omitted.

Method 500

Figure 5:
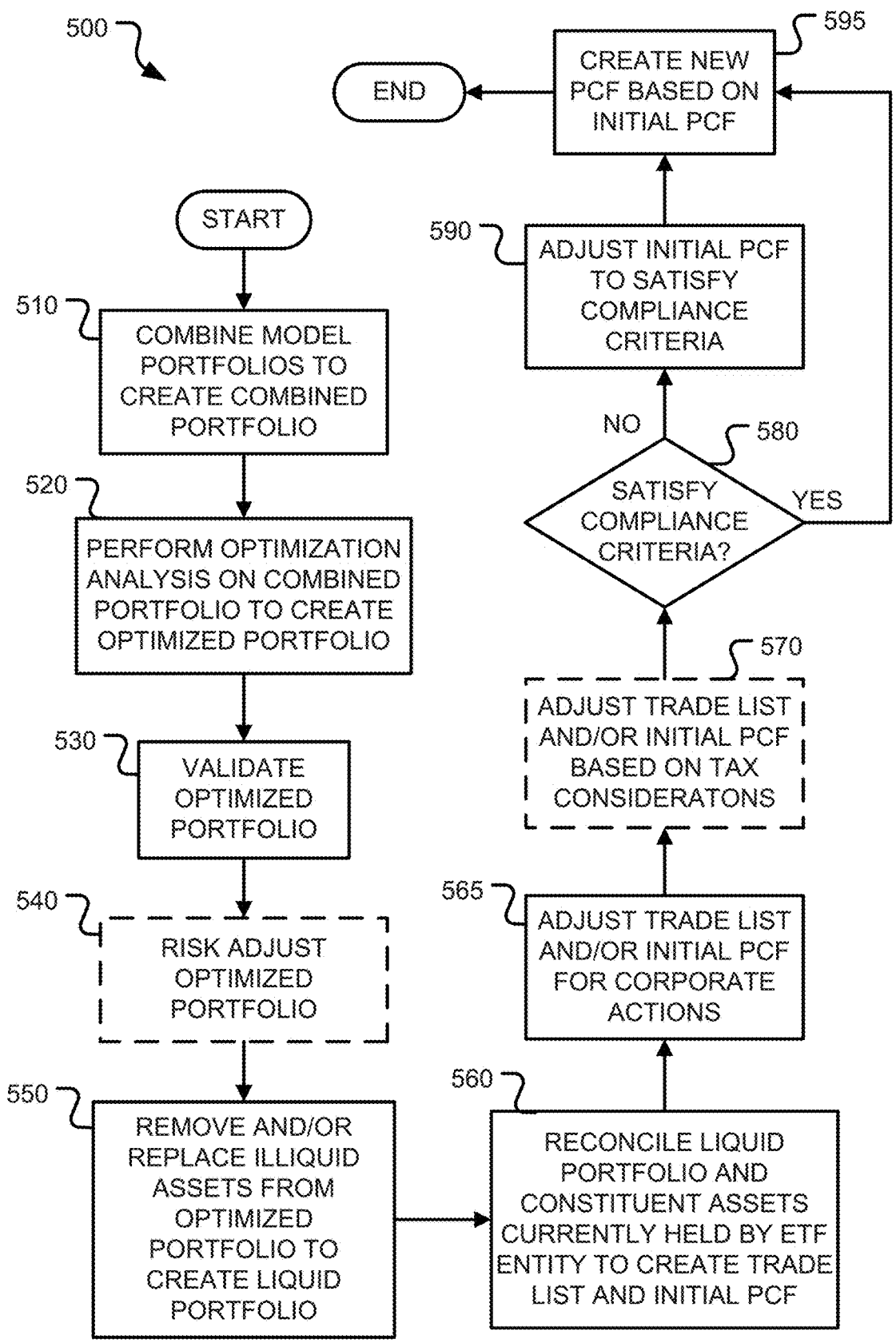
FIG. 5 is a flow diagram of a method that may be performed by one or more computing devices operated by the modeling entity.

FIG. 5 is a flow diagram of a method 500 that may be performed by the one or more computing devices 220 (see FIG. 2) operated by the modeling entity 404 (see FIG. 4) in block 330 of the method 300 (see FIG. 3). The method 300 generates the new PCF based at least in part on the model portfolios provided by those of the portfolio managers 402 that are active (as opposed to being "on deck").

Referring to FIGS. 4 and 5, in first block 510, the modeling entity 404 combines the model portfolios (received from the portfolio managers 402) to create a combined portfolio. By way of a non-limiting example, the model portfolios may be combined by equally weighting the constituent assets identified in each of the model portfolios. For example, if there are three active portfolio managers, the constituent assets of each of their portfolios may be multiplied by one third and the three equally weighted model portfolios combined into the single combined portfolio.

By way of another non-limiting example, custom weighting may be used. For example, the constituent assets of the model portfolio provided by the Portfolio Manager "A" may be multiplied by a weight of 0.2 (or 20%), the constituent assets of the model portfolio provided by the Portfolio Manager "B" may be multiplied by a weight of 0.3 (or 30%), and the constituent assets of the model portfolio provided by the Portfolio Manager "C" may be multiplied by a weight of 0.5 (or 50%). The custom weights may be determined based at least in part on desired risk return characteristics for the ETF. Using this approach, the custom weights are used to conform the contributions of the selected portfolio managers to a particular risk return profile. For example, the weights may be assigned by evaluating conformance of the portfolio managers to a set of guidelines. Exemplary guidelines may include an excess return target compared to a benchmark, a desired maximum risk variation, and the like. By way of non-limiting examples, the excess return target may be about 2% above the benchmark, and the desired maximum risk variation may be about 2% to about 3%.

In block 510, the modeling entity 404 "crosses" each of the model portfolios with the constituent assets 405 currently held by the ETF entity 406 and with the other model portfolios. Crossing is a conventional technique that identifies duplicate trades as well as trades that cancel or offset one another. The goal of crossing is typically to identify and remove duplicate holdings and reduce risk. Thus, in block 510, the modeling entity 404 may identify changes in the number of shares and weights for each constituent asset across the model portfolios to identify net changes in holdings of the constituent asset.

In block 520, the modeling entity 404 performs an optimization analysis on the combined portfolio to create an optimized portfolio. By way of a non-limiting example, the optimization analysis may include removing a "tail" of the combined portfolio. The tail includes constituent assets of the combined portfolio for which less than a threshold number of shares are to be held. In other words, removing the tail removes small investment positions from the combined portfolio. For this reason, removing the tail may reduce trading costs.

By way of another non-limiting example, the optimization analysis may be configured to reduce trading frequency. For example, the optimized portfolio may be matched to the combined portfolio less frequently than changes occur in the combined portfolio. Specifically, while the combined portfolio may change daily, the optimized portfolio may match the combined portfolio only once every predetermined number of days (e.g., every 10 business days). This process helps avoid trades initiated by the selected portfolio managers during the predetermined number of days (or "trading interval") that would otherwise offset one another. For example, if on a first day, the model portfolio provided by the Manager "A" indicates 100 shares of a particular asset should be purchased, and the next day, the model portfolio provided by the Manager "B" indicates 100 shares of a particular asset should be sold, by not matching the optimized portfolio to the combined portfolio on a daily basis, the purchase and sale of 100 shares of the particular asset may be avoided.

By way of another non-limiting example, the optimization analysis may be configured to delay changes to the optimized portfolio by a predetermined amount of time (e.g., 10 business days). The delay may help avoid competing with other accounts that are also managed by the selected portfolio managers.

By way of another non-limiting example, the optimization analysis may be configured to avoid holding a number of shares of a constituent asset below a threshold number (or a small position in the constituent asset) and to avoid trades that change the weight of a constituent asset in the optimized portfolio by an amount below a threshold amount. This reduces turnover and trading costs, as well as the number of constituent assets that need to be processed by the AP(s) and ETF entity. The threshold number of shares may be fund-specific and based at least in part on the level of diversification of the multi-manager ETF. More stringent criteria (e.g., lower threshold values) may be used to eliminate small positions and trades in more diversified multi-manager ETFs.

In block 530, the modeling entity 404 validates the optimized portfolio. By way of non-limiting examples, in block 530, the modeling entity 404 may verify that the identifiers of the constituent assets of the optimized portfolio are correct, validate the number of shares (or weights) of each of the constituent assets of the optimized portfolio are acceptable, and the like.

In block 530, the modeling entity 404 may validate the optimized portfolio to ensure the optimized portfolio accurately reflects future corporate actions (e.g., stock splits, cash reinvestments, dissolutions, and the like). For example, if the optimized portfolio includes 100 shares of a particular equity and the modeling entity 404 knows the particular equity will split 2:1 effective the next day, the modeling entity 404 determines whether the 100 shares takes the stock split into account. If it does not, in block 565 (described below) the modeling entity 404 will increase the number of shares of the particular entity in the optimized portfolio to 200 shares. On the other hand, if the optimized portfolio takes the stock split into account, the modeling entity 404 need not take any action.

In block 530, the modeling entity 404 may receive conventional data feeds that identify corporate actions and the effective dates of those corporate actions. Because the new PCF may not become effective until after the method 500 is performed (e.g., about 24 hours after the method 500 is performed), the new PCF may have to account for corporate actions having effective dates in the future. For example, as mentioned above, the method 300 illustrated in FIG. 3 may occur over three trading days with the new PCF becoming effective on the third day. In such embodiments, the new PCF does not become effective until about 24 hours after the method 500 is performed. Therefore, new PCF must account for corporate actions having effective dates in the future. In other words, the new PCF must account for corporate actions having the first, second, and third trading days as their effective dates.

Optionally, information related to corporate actions (e.g., data feeds) may be obtained from the one or more sources of market information 408. Thus, the one or more computing devices 240 (see FIG. 2) may be configured to provide information related to corporate actions to the one or more computing devices 220 (see FIG. 2) operated by the modeling entity 404 via the network 260.

In optional block 540, the modeling entity 404 performs a risk analysis on the optimized portfolio to thereby risk adjust the optimized portfolio. The risk analysis includes determining whether the optimized portfolio is within a set of predefined risk parameter values. The set of predefined risk parameter values may include threshold values for volatility, momentum, size, beta with respect to a benchmark (e.g., an index), and the like. By way of a non-limiting example, the risk analysis may evaluate risk based on risk models developed by companies (such as Axioma, Inc. having an address of 17 State Street, Suite 2550, New York, N.Y. 10004, MSCI Inc. having an address of One Chase Manhattan Plaza, 44th Floor, New York, N.Y. 10005, Northfield Information Services, Inc. having an address of 77 North Washington St., 9th Floor, Boston, Mass. 02114, and the like) that develop tools for investment portfolio managers. However, this is not a requirement. If the optimized portfolio is not within the set of predefined risk parameter values, one or more of the constituent assets may be replaced, the number of shares of one or more of the constituent assets may be modified, and/or the weights assigned to one or more of the constituent assets may be modified such that the risk-adjusted optimized portfolio is within the set of predefined risk parameter values.

In block 550, the modeling entity 404 adjusts the optimized portfolio to remove, reduce, and/or replace each illiquid asset in the optimized portfolio to thereby create a liquid portfolio. Liquidity is a measure of investability and refers to the ease with which an asset may be traded. An asset (e.g., a security) with poor liquidity may be difficult to purchase and/or sell. Alternatively, an asset with high liquidity may be readily purchased and sold. The liquidity of an asset can generally be determined by examining its past trading activity. If an asset is traded infrequently and in small amounts, it likely has poor liquidity. Conversely, if an asset is traded frequently and in large amounts, it likely has good liquidity. In block 550, assets that the AP(s) 104 cannot purchase (e.g., assets with poor liquidity) are excluded from the liquid portfolio.

By way of a non-limiting example, in block 550, each illiquid asset may be removed from the optimized portfolio or the number of shares of the illiquid asset reduced to a level at which the illiquid asset is considered liquid. By way of a non-limiting example, a level at which an asset is considered liquid may be 10% of the Average Daily Trading Volume of the asset. Assets having an Average Daily Trading Volume below a predetermined threshold value may be removed from the optimized portfolio.

By way of another non-limiting example, in block 550, the modeling entity 404 may assign a liquidity score to each asset in the optimized portfolio based on a set of constraints. For example, the liquidity scores may include an illiquid score, a moderately liquid score, and a liquid score. Assets receiving an illiquid score may be removed from the optimized portfolio. As mentioned above, the constituent assets 405 held by the ETF entity 406 may include assets not identified in the new PCF. In such embodiments, at least a portion of the assets receiving a moderately liquid score may be retained in the optimized portfolio but may be excluded from the new PCF. If necessary, such assets may be listed on the trade list.

In some embodiments, the liquidity scores may be determined based at least in part on two considerations. The first consideration is how many baskets of the assets identified in the optimized portfolio could be purchased (which will determine the size of the ETF) by the AP(s) 104 before their ability to purchase additional baskets is hampered by the availability of one or more of the assets. The second consideration is whether similar assets are available to hedge investment in the ETF. If too few baskets could be created (e.g., fewer than a threshold number) or the investment in the ETF cannot be hedged, the assets limiting the number of baskets or preventing hedging are assigned an illiquid score.

Alternate methods of identifying illiquid assets and removing, reducing, and/or replacing them in a fund (e.g., an ETF) are known to those of ordinary skill in the art and the method 500 is not limited to use with any particular method.

In block 560, the modeling entity 404 reconciles the liquid portfolio with the constituent assets 405 currently held by the ETF entity 406 to generate the trade list. The trade list identifies trades required to conform the constituent assets 405 held by the ETF entity 406 to the liquid portfolio. The modeling entity 404 also generates an initial PCF based on the liquid portfolio.

In block 565, if necessary, the modeling entity 404 adjusts the trade list and/or initial PCF to account for corporate actions (e.g., stock splits, cash reinvestments, dissolutions, and the like). In block 565, the modeling entity 404 may receive conventional data feeds that identify corporate actions and the effective dates of those corporate actions. As mentioned above, the method 300 illustrated in FIG. 3 may occur over three trading days. In such embodiments, the new PCF does not become effective until about 24 hours after the method 500 is performed. Therefore, the new PCF must account for corporate actions having effective dates in the future. In other words, the new PCF must account for corporate actions having the first, second, and third trading days as their effective dates.

For example, if the initial PCF includes 100 shares of a particular equity and the modeling entity 404 knows the particular equity will split 2:1 effective the next day, the modeling entity 404 will increase the number of shares of the particular entity in the initial PCF to 200 shares. Methods of making such adjustments are known to those of ordinary skill in the art and will not be described in detail herein. If the trade list or the initial PCF is adjusted in block 565, the liquid portfolio may also be adjusted accordingly.

In optional block 570, the modeling entity 404 performs a tax analysis and adjusts the trade list and/or initial PCF based on capital gains tax considerations. Unrealized capital gains arise when the trade list indicates a particular constituent asset is to be sold that would trigger a significant realized capital gain and therefore, likely expose the ETF to a significant capital gains tax. If the gain is large, the tax analysis considers other options before blindly executing the sale. For example, the modeling entity 404 may alter the trade list (e.g., to remove the sale of an asset having an unrealized capital gain) and the initial PCF (to add the asset having the unrealized capital gain so that the asset can be transferred to the AP(s) 104 when creation units are redeemed). The tax analysis may include identifying unrealized capital gains for each asset the trade lists indicates is to be sold and/or each constituent asset of the liquid portfolio down to a specific tax lot. For example, the fund manager 407 may periodically review the unrealized capital gains for each constituent asset of the liquid portfolio down to a specific tax lot to identify potential problems (e.g., large unrealized capital gains). The tax analysis is complicated by on-going price changes for the particular constituent asset. Methods of identifying unrealized capital gains for each constituent asset (e.g., down to a specific tax lot) are known to those of ordinary skill in the art and will not be described in detail herein.

In decision block 580, the modeling entity 404 determines whether the ETF that would be defined by the initial PCF is compliant with relevant laws and/or regulations. If the ETF is compliant, the decision in decision block 580 is "YES." Otherwise, the decision in decision block 580 is "NO." Methods of determining whether the ETF that would be defined by the initial PCF is compliant with relevant regulations and/or laws are known to those of ordinary skill in the art and will not be described in detail herein.

When the decision in decision block 580 is "NO," in block 590, the modeling entity 404 adjusts the initial PCF, and if necessary, the trade list, such that the ETF that would be defined by the initial PCF is compliant with relevant regulations. Then, the modeling entity 404 advances to block 595.

When the decision in decision block 580 is "YES," the modeling entity 404 advances to block 595.

In block 595, the modeling entity 404 creates the new PCF based on the initial PCF. The new PCF identifies the assets in one creation unit of the ETF.

Then, the method 500 terminates.

The methods 300 and 500 are applicable to all asset classes included in Exchange-Traded Products and the portfolio managers selected in block 310 of the method 300 may include portfolio managers who generate model portfolios containing constituent assets belonging to a single asset class, portfolio managers who generate model portfolios containing constituent assets belonging to multiple asset classes, and a combination thereof.

Computing Device

Figure 6:
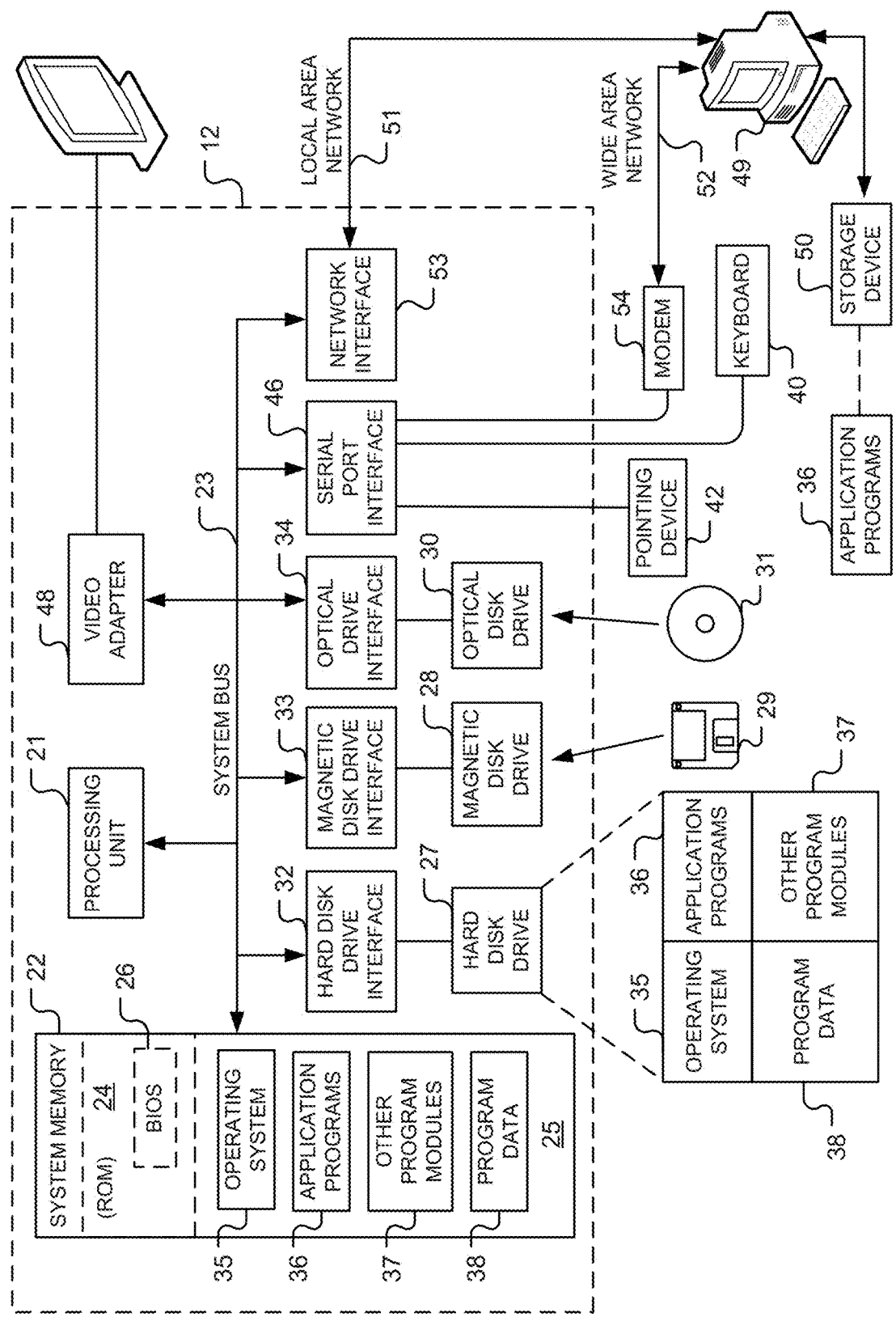
FIG. 6 is a diagram of hardware and an operating environment in conjunction with which implementations of the computing devices and network of the system of FIG. 2 may be practiced.

FIG. 6 is a diagram of hardware and an operating environment in conjunction with which implementations of the computing devices 210, 220, 225, 230, 240, and 250, and the network 260 of the system 200 may be practiced. The description of FIG. 6 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 6 includes a general-purpose computing device in the form of a computing device 12. Referring to FIG. 2, the computing devices 210, 220, 225, 230, 240, and 250 may each be implemented using a computing device substantially similar to the computing device 12.

Returning to FIG. 6, the computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus ("USB"), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types physical feedback (e.g., a force feedback game controller).

The input devices described above are operable to receive user input and selections. Together the input and display devices may be described as providing a user interface. The input devices may be used to receive information from the AP(s) 104, the PCF information distribution entity 110, the portfolio managers 402, the modeling entity 404, the ETF entity 406, and/or the source of market information 408. The user interface may be used to display the PCF, the ETF constituent information, the trade list, a listing of the constituent assets 405, financial information, and the like.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 6 include a local-area network (LAN) 51 and a wide-area network (WAN) 52. Such networking environments are commonplace in offices, enterprise-wide computer networks, intranets and the Internet. The network 260 (see FIG. 2) may be implemented using at least a portion of the networked environment described above.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

The memory of the one or more computing devices 220 operated by the modeling entity 404 stores computer executable instructions that when executed by one or more processors cause the one or more processors to perform all or portions of the methods 300 (see FIG. 3), and 500 (see FIG. 5). Such instructions may be stored on one or more non-transitory computer-readable media.

The memory of the one or more computing devices 225 operated by the ETF entity 406 stores computer executable instructions that when executed by one or more processors cause the one or more processors to perform all or portions of the methods 300 (see FIG. 3), and 500 (see FIG. 5). Such instructions may be stored on one or more non-transitory computer-readable media.

The memory of the one or more computing devices 210 operated by the portfolio managers 402 stores processor executable instructions that when executed by one or more processors cause the one or more processors to perform a portion of the method 300 (see FIG. 3). Such instructions may be stored on one or more non-transitory computer-readable media.

The memory of the one or more computing devices 250 operated by the AP(s) 104 stores processor executable instructions that when executed by one or more processors cause the one or more processors to perform portions of the method 300 (see FIG. 3). Such instructions may be stored on one or more non-transitory computer-readable media.

The memory of the one or more computing devices 230 operated by the PCF information distribution entity 110 stores processor executable instructions that when executed by one or more processors cause the one or more processors to perform portions of the method 300 (see FIG. 3). Such instructions may be stored on one or more non-transitory computer-readable media.

The memory of the one or more computing devices 240 operated by the one or more sources of market information 408 stores processor executable instructions that when executed by one or more processors cause the one or more processors to perform portions of the method 300 (see FIG. 3). Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-implemented method comprising:
    receiving, by at least one computing device, first data on a first trading day over a computer network, the first data representing a plurality of different portfolio compositions and having been sent to the at least one computing device by a plurality of remote first computing devices;
    weighting, by the at least one computing device, each of the plurality of different portfolio compositions to obtain a plurality of weighted portfolio compositions;
    combining, by the at least one computing device, the plurality of weighted portfolio compositions to obtain a combined portfolio composition before a relevant stock market opens on a second trading day, the second trading day being consecutive with the first trading day;
    transmitting, by the at least one computing device, second data over the computer network to a management computing system when the relevant stock market is closed and before the relevant stock market opens on the second trading day, the second data identifying changes to current constituent assets of an exchange traded fund that produce future constituent assets, units of each of the future constituent assets being tradable on the relevant stock market when the relevant stock market is open, the management computing system making the changes to the current constituent assets on the second trading day when the relevant stock market is open; and
    transmitting, by the at least one computing device, third data over the computer network to a plurality of remote second computing devices when the relevant stock market is closed and before the relevant stock market opens on the second trading day, the third data identifying the future constituent assets to operators of the plurality of remote second computing devices, the third data being transmitted when the relevant stock market is closed and before the relevant stock market opens on the second trading day to prevent any of the operators from trading any units of the future constituent assets on the relevant stock market before the relevant stock market is open on the second trading day, each of the operators being able to trade a basket of constituent assets for a creation unit of the exchange traded fund starting on a third trading day, the third trading day being consecutive with the second trading day.

2. The computer-implemented method of claim 1, wherein the second data is a portfolio composition file ("PCF").

3. The computer-implemented method of claim 1, wherein the third data is a portfolio composition file ("PCF").

4. The computer-implemented method of claim 1, wherein the combined portfolio composition identifies a plurality of assets, and a number of shares of each of the plurality of assets, and the computer-implemented method further comprises:
    identifying, by the at least one computing device, one or more illiquid assets within the plurality of assets before the relevant stock market opens on the second trading day; and
    modifying, by the at least one computing device, the combined portfolio composition before the relevant stock market opens on the second trading day by one or more of the following: (1) removing the one or more illiquid assets from the combined portfolio composition, (2) reducing the number of shares of the one or more illiquid assets in the combined portfolio composition, or (3) replacing the one or more illiquid assets in the combined portfolio composition with different assets that are more liquid.

5. The computer-implemented method of claim 1, wherein the combined portfolio composition identifies a plurality of assets and a value for each asset from which a number of shares of the asset may be determined, and the method further comprises:

removing, by the at least one computing device, identifications of any assets having a value below a threshold number from the combined portfolio composition.

6. The computer-implemented method of claim 1, further comprising:

crossing, by the at least one computing device, each of the plurality of different portfolio compositions with one another and the current constituent assets before the at least one computing device weights each of the plurality of different portfolio compositions.

7. The computer-implemented method of claim 1, wherein the at least one computing device weights each of the plurality of different portfolio compositions equally.

8. The computer-implemented method of claim 1, wherein transmitting the third data over the computer network to the plurality of remote second computing devices comprises:

transmitting the third data over the computer network to at least one distribution computing device for transmission thereby to the plurality of remote second computing devices.

9. The computer-implemented method of claim 1, wherein the second data comprises a trade list that identifies one or more trades to be performed by the management computing system.

10. The computer-implemented method of claim 1, wherein each of the plurality of different portfolio compositions comprises a buy-list and a sell-list, the buy-list identifies a plurality of first assets to buy and a number of shares of each of the plurality of first assets to be bought, and the sell-list identifies a plurality of second assets to be sold and a number of shares of each of the plurality of second assets to be sold.

11. The computer-implemented method of claim 1, wherein only the operators are authorized to trade the basket of constituent assets for the creation unit of the exchange traded fund.

* * * * *